United States Patent
Albat et al.

(10) Patent No.: US 8,031,911 B2
(45) Date of Patent: Oct. 4, 2011

(54) PRINT PROOFING USING MOTTLING TILE

(75) Inventors: Andreas M. Albat, Delta (CA); Richard R. Bielak, Port Coquitlam (CA)

(73) Assignee: Eastman Kodak Company, Rochester, NY (US)

( * ) Notice: Subject to any disclaimer, the term of this patent is extended or adjusted under 35 U.S.C. 154(b) by 670 days.

(21) Appl. No.: 12/119,678

(22) Filed: May 13, 2008

(65) Prior Publication Data

US 2009/0285503 A1     Nov. 19, 2009

(51) Int. Cl.
*G06K 9/00* (2006.01)

(52) U.S. Cl. ........ 382/112; 382/163; 382/254; 382/266; 382/275

(58) Field of Classification Search ................... 382/112, 382/162–167, 254, 266, 275
See application file for complete search history.

(56) References Cited

U.S. PATENT DOCUMENTS

| | | | |
|---|---|---|---|
| 2002/0008880 A1* | 1/2002 | Dewitte et al. | 358/1.9 |
| 2005/0219625 A1* | 10/2005 | Koifman et al. | 358/3.12 |
| 2006/0050317 A1* | 3/2006 | Foster et al. | 358/3.06 |
| 2007/0000402 A1* | 1/2007 | Abrott | 101/483 |

* cited by examiner

*Primary Examiner* — Wesley Tucker
(74) *Attorney, Agent, or Firm* — Nelson Adrian Blish

(57) ABSTRACT

A method for producing mottling in an image includes modifying digital colorant information in a digital image data file for at least one of a plurality of colorants. The degree of modification is based on digital colorant information in the digital image data file, mottling information from a mottling tile, and a colorant gain curve for at least one colorant. The colorant gain curve is obtained by determining a tint percentage, the variation of the tint of the printed at least one colorant when printed at a tint percentage on volume printing stock. The mottling information has a spatial frequency distribution substantially equal to the spatial frequency distribution of the mottling produced by at least one colorant on a volume printing stock. The method allows the digital image to emulate the image that would result if the digital image was printed on a volume printer on high volume printing stock.

6 Claims, 4 Drawing Sheets

PRINT PROOFING USING MOTTLING TILE

FIELD OF THE INVENTION

The present invention relates to a proof printing adjustment system and method. In particular, the present invention relates to a proof printing system and method to emulate the mottling that typically occurs in printed images on volume printing stock.

BACKGROUND OF THE INVENTION

It is common to provide a sample of an image to a customer for approval prior to printing a large number of copies of an image using a high volume output device such as a printing press to print the image on a high volume paper or printing stock. The sample image is known as a "proof". The proof is used to ensure that the consumer is satisfied with, among other things, one or more colors in the image.

It is not, however, cost effective to print the proof using high volume output devices of the type used to print large quantities of the image. This is because it is expensive to set up high volume output devices to print the image. Accordingly, it has become a practice in the printing industry to use digital color printers to print proofs. Digital color printers render color prints of images that have been encoded in the form of digital data. This data includes code values indicating the colors to be printed in the image and the amount of colorant to be used. When the color printer generates a printed output of an image, it is intended that the image recorded on the printed output will contain the exact colors called for by the code values in the digitally encoded data.

Accordingly, digital color printers have been developed that can be adjusted so that they can mimic the performance of high volume output devices. Such adjustable color printers are known in the industry as "proofers". Proofers generally employ a different printing technology from that used by the high volume printer. Associated with this, the media on which the proof is executed is correspondingly different from the media that the high volume output device employs. More specifically, the texture of the two types of media can differ significantly, the high volume media usually being of the lesser technical quality and exhibiting more texture.

Since the texture of the high volume media affects the behavior of ink deposited upon it by the high volume output device, and since the different colorants employed in a typical multi color volume print can have different liquid and colorant properties, they may differ in their behavior on the high volume printing stock. This implies that the texture of the high volume media directly affects the color behavior and produces a discernable mottling effect which has a distinct associated color variation aspect.

The challenge is to suitably modify the proofing process to allow for the image mottling effect of the high volume media and, in particular, to allow for the color mottling that happens as a result of the different behavior of the different colorants.

SUMMARY OF THE INVENTION

According to one aspect, the present invention provides a method for producing mottling in an image. The method comprises modifying digital colorant information in a digital image data file of the image for at least one of a plurality of colorants. The degree of the modifying is based on the digital colorant information in the digital image data file and on mottling information from a mottling tile. The modifying comprises combining the digital colorant information and the mottling information based on a colorant gain curve for at least one colorant. The colorant gain curve for at least one colorant is obtained by a process comprising determining as a function of tint percentage the variation of the tint of the printed at least one colorant when printed at a tint percentage on a volume printing stock.

The mottling information has a spatial frequency distribution substantially equal to the spatial frequency distribution of the mottling produced by the at least one colorant on a volume printing stock. The method allows the digital image contained in the digital image data file to be printed on proofing media on a proofing device whilst exhibiting a mottling that emulates the image that would result if the digital image data file were provided to a volume printer printing on high volume printing stock.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

The present invention will be more readily understood from the detailed description of exemplary embodiments presented below considered in conjunction with the attached drawing.

DETAILED DESCRIPTION OF THE INVENTION

Figure 1:
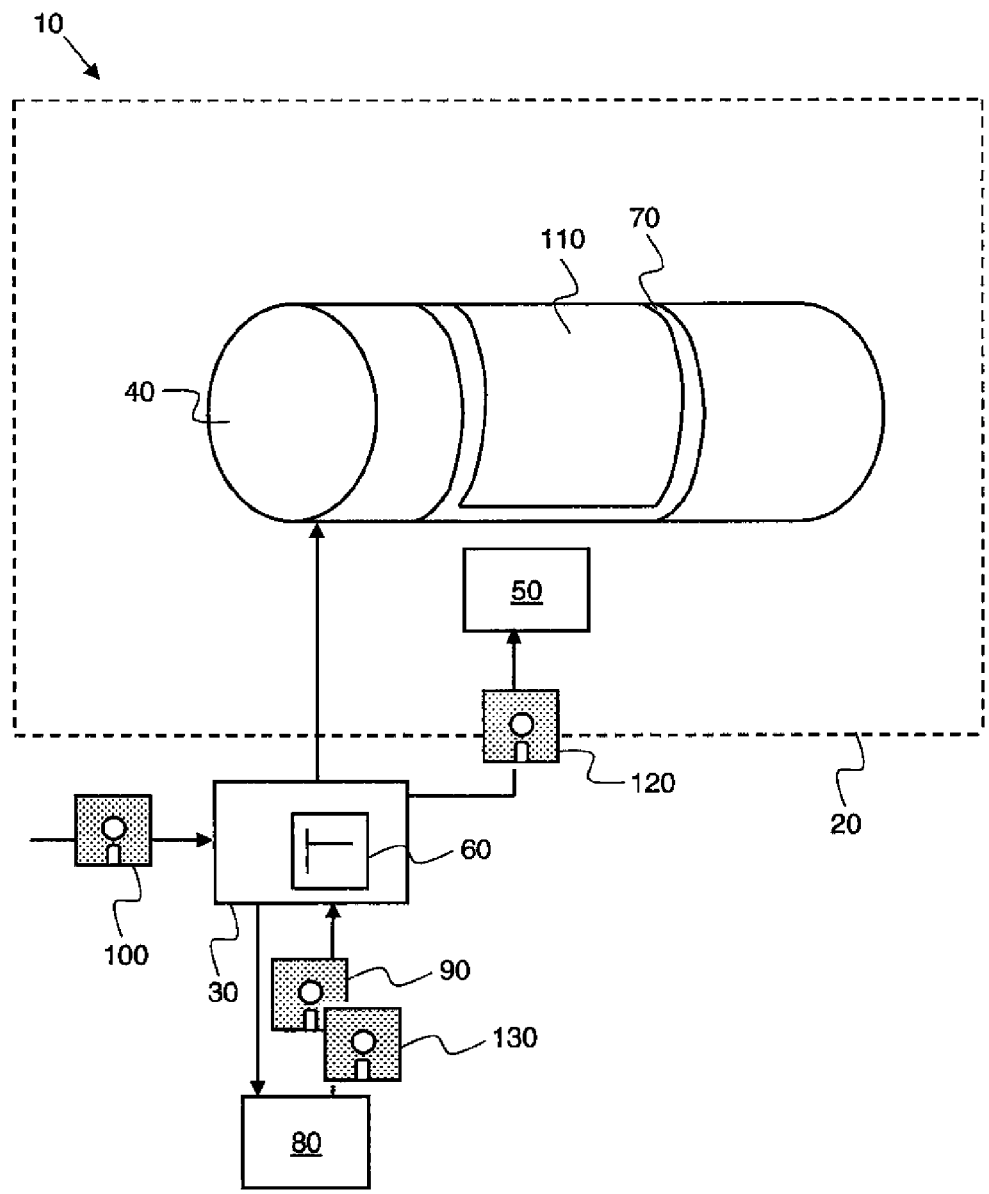
FIG. 1 shows a block diagram of a proofing system, according to the present invention, for emulating on a proofing system the mottling effect of high volume paper printing stock.

In FIG. 1, a printing system 10 of the present invention is illustrated schematically. Printing system 10 includes a printer 20 and a controller 30 coupled to the printer 20. Printer 20 is preferably a commercial printer and is controlled by the controller 30. Drum 40 is internal to printer 20. Drum 40 and a print head 50 are coupled to controller 30. Controller 30 is programmed with control program 60. A proof media 70 is coupled to drum 40. Drum 40 is preferably a printer drum; however, it may also be a platen or any other suitable type of printing support surface. Database 80 can store a mottling tile data file 90 and mottling gain curves 130. In a preferred embodiment of the present invention, mottling tile data file 90 is pre-generated and stored in database 80.

In a further preferred embodiment of the present invention mottling tile data file 90 is prepared by a process described below and represents amplitude modulation data distributed over a tile area. The modulation is semi-random and has a specified frequency bandwidth. Different variants of mottling tile data file 90, representing random modulations of different frequency bandwidths, may be stored in database 80 for use in the method of the present invention. This allows the user to select what mottling frequency tile they wishes to use to emulate the mottle effect of the high volume stock to be employed for volume printing. The randomness of the distribution on a given tile may be modified proximate the edges of the tile to allow identical nearest neighbor tiles to have continuity at adjoining edges, thereby avoiding discontinuities that could impress the perimeter of the tile in a grid across the rendered image.

Figure 2:
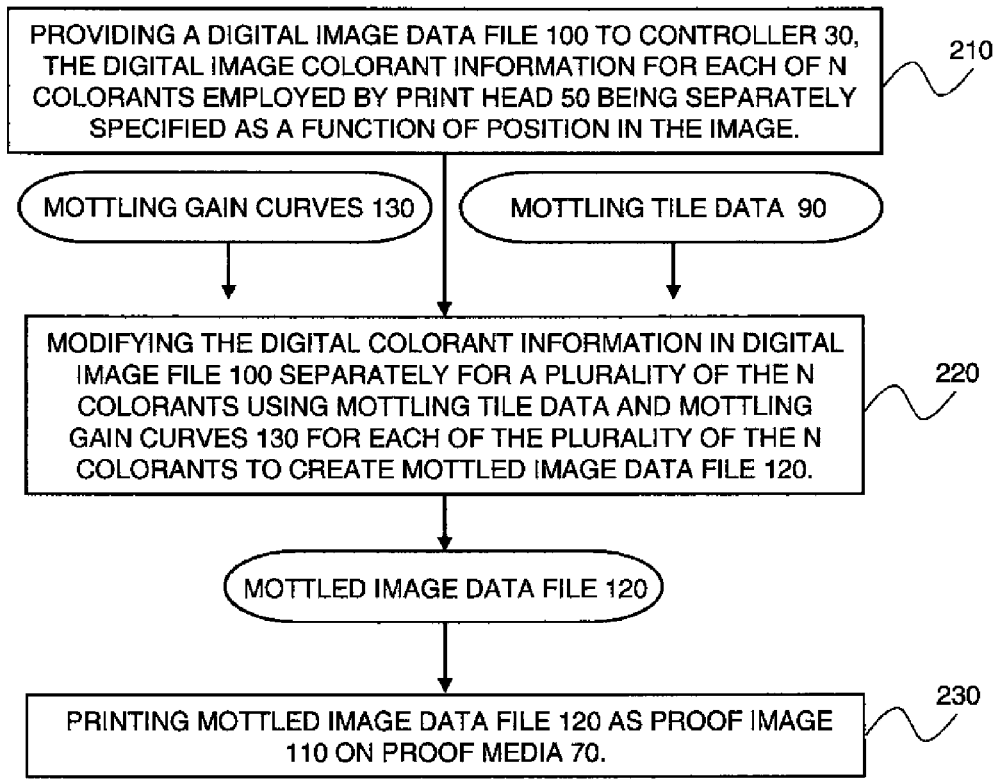
FIG. 2 shows a flow chart that describes a method, according to the present invention, for emulating on a proofing system the mottling effect of high volume paper printing stock.

The method of the present invention, described at the hand of the flow diagram of FIG. 2, comprises providing 210 a digital image data file 100 to controller 30, the digital image colorant information for each colorant employed by print head 50 being separately specified as a function of position in the image. In general there are N colors used to specify the digital colorant information in digital image data file 100. By way of example, the printer can employ colors C, M, Y, and K or may have additional special colorants. Digital image data file 100 specifies to controller 30 the amount of each of the N colorants to be printed by print head 50 on proof media 70 at a specified position in order to render proof image 110 in the absence of any modification due to mottling or paper grain or the like.

The method of the present invention is embedded in control program 60 and comprises modifying 220 the digital colorant information in digital image data file 100 separately for a plurality of the N colorants using mottling gain curves 130 and mottling tile data 90, suitably stepped and repeated over the surface of the image contained in digital image data file 100. The degree of the modifying is based on the digital colorant information in the digital image data file 100 and mottling information from mottling tile data file 90. This modifying is done for each of the plurality of colorants by changing the colorant information in digital image data file 100 for each spatial location in the image based on the mottling tile data 90 for that point and the mottling gain value for the colorant specified in digital image data file 100 at that point. In the present invention, the term "mottled image data file" is used to describe the modified image data file 120 so created.

The method of the present invention comprises controller 30 sending mottled image data file 120 from controller 30 to print head 50. Controller 30 controls print head 50 and drum 40, thereby executing the printing 230 of mottled image data file 120 as proof image 110 on proof media 70. By choosing a mottling tile data file 90 to be of a type appropriate to (i) the paper stock on which the volume images of digital image data file 100 will ultimately be printed and (ii) the volume printing process to be used, proof image 110, as a result of the method of the present invention, emulates the result that will be obtained on the volume stock with the intended printing process to a very good degree. The independent treatment of the different colorants in the method of the present invention causes the mottle effect obtained to not only be a variation in amplitude, but also a variation in color, as is the case for the actual images on the volume stock.

Figure 3:
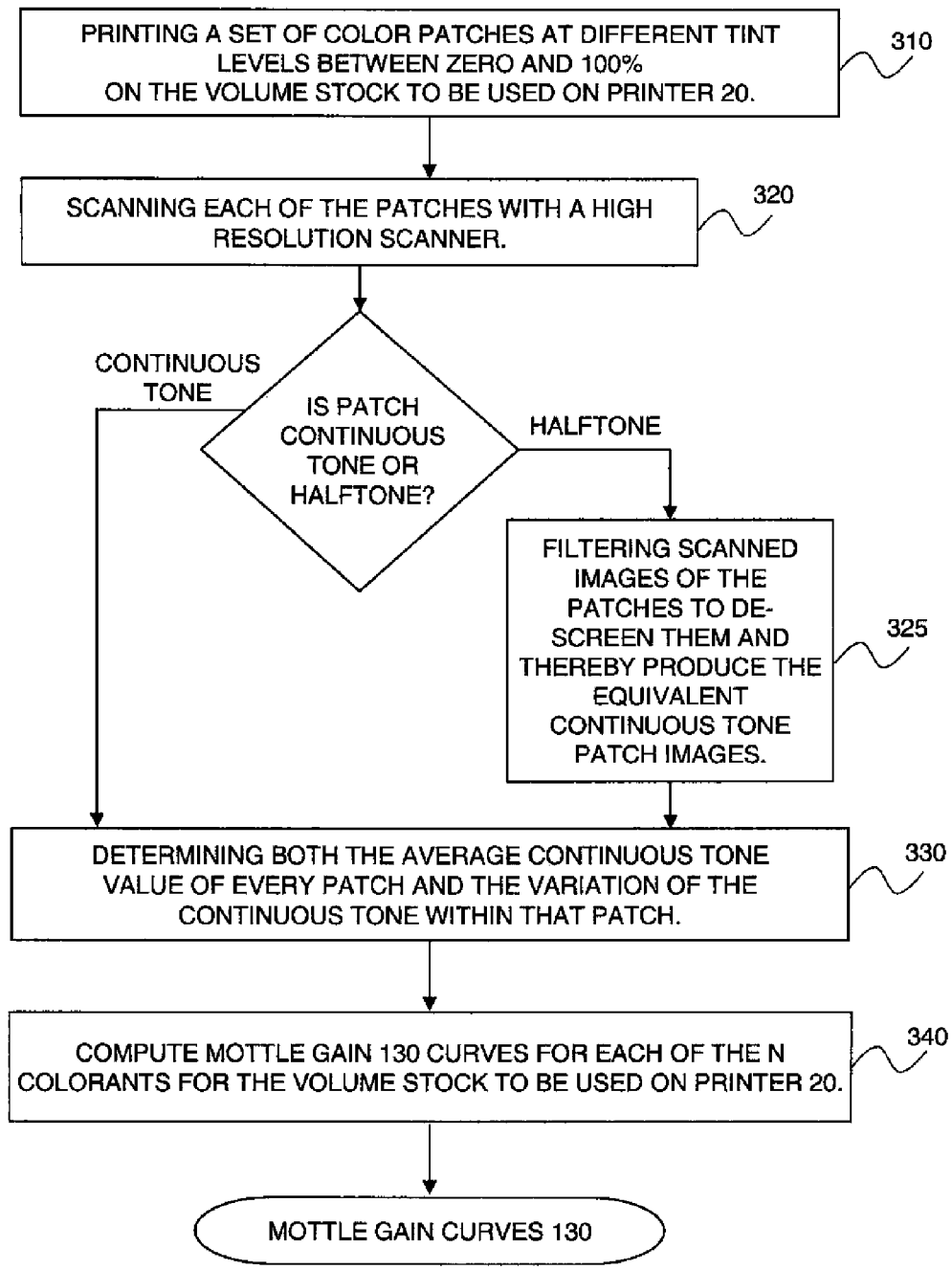
FIG. 3 shows a flow chart describing a method, according to the present invention, for obtaining a mottling gain curve for a colorant.

The mottling gain curves 130 are generated by the following method of the present invention as shown in the flow diagram of FIG. 3. Firstly, it is noted that each colorant is treated independently from any of the other colorants used by the particular printer 20 to be employed. By way of example, the four particular colorants C, M, Y, and K are employed by printer 20. In general there can be N colors and the treatment can be applied to any one of them and repeated for any number of them. Selecting magenta (M) as particular example, the method comprises printing 310 a set of color patches at different tint levels between zero and 100% on the volume stock to be used on printer 20 and then scanning 320 each of these patches with a high resolution scanner. If the patches are printed in halftone, then the scanned images of the patches are filtered 325 to de-screen them and thereby produce the equivalent continuous tone patch images. If the patches are printed in continuous tone to start with, then no such de-screening is required.

The method of the present invention comprises determining 330 both the average continuous tone value of every patch and the variation of the continuous tone within that patch. The variation is a direct measure of the degree of mottle in the patch. By plotting the variation versus the average over the range from zero tone to 100%, a "mottle gain curve" is obtained 340. A best fit can be done to this curve to obtain it in analytical form and can provide smoothing in the data to facilitate the method. This gain curve is profoundly different for different colorants. Cyan colorant, for example, may exhibit a consistent increase in "mottle gain" as the tint level increases to 100%. On the other hand, K (black) colorant exhibits its lowest mottle gain at 0 and 100% with a peak near the middle of the range. Magenta colorant may rise with increasing tint level and then reduce partially above a certain percentage. Yellow colorant may have a mottle gain curve similar in shape to that of black colorant, but with a lesser maximum gain. These curves can be stored separately in database 80.

Figure 4:
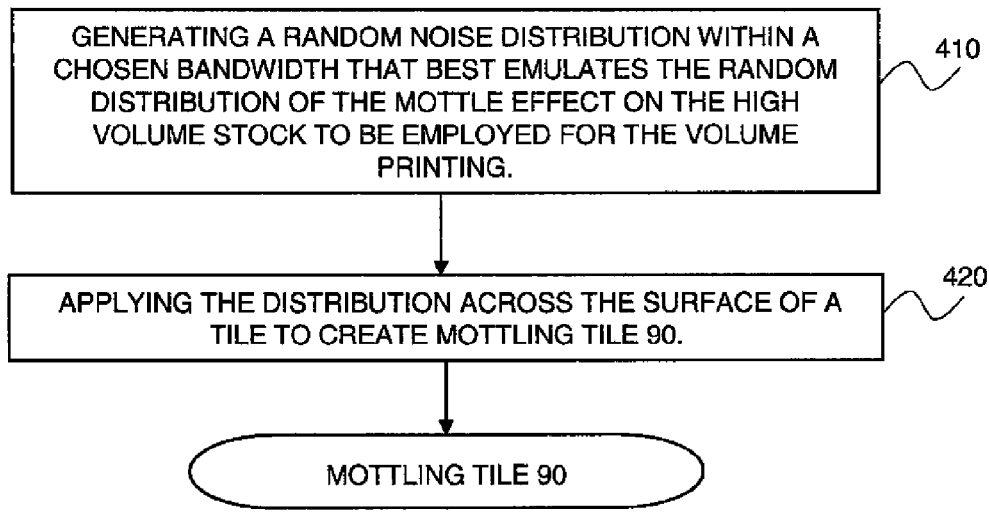
FIG. 4 shows a flow chart describing a method, according to the present invention, for obtaining a mottling tile.

The method for preparing the mottling tiles 90, as shown in the flow diagram of FIG. 4, comprises generating 410 a random noise distribution within a chosen bandwidth that best emulates the random distribution of the mottle effect on the high volume stock to be employed for the volume printing. The method comprises applying 420 the distribution across the surface of a tile, where the tile surface can be smaller than the surface of the entire proof image 110 to be printed, so that a plurality of tiles are required to cover the entire surface of the proof image 110. The tile prepared in this way is described in the present invention as a "mottling tile". The mottling tile 90 contains no information specific to any colorant. The size and distribution of the noise signal is chosen such that the sum of all the noise values across the surface of the mottling tile is zero.

In one embodiment of the present invention, a fixed pattern is employed instead of random noise, so that the generating step 410 generates the fixed pattern at a frequency that is selectable by the user.

Mottling tile 90 is prepared at the highest resolution that it is anticipated to be employed. Before applying mottling tile 90 in modifying step 220, mottling tile 90 is resampled to have the same resolution as the image in digital image data file 100.

Returning to FIG. 2, the method of modifying digital image data file 100 comprises multiplying, separately for each colorant selected, the mottling tile value at each pixel location by the mottle gain value for the specific colorant at corresponding pixel location in digital image data file 100. The mottling gain values employed in this way are obtained from the stored mottling gain curves for each colorant by looking up the mottling gain value corresponding to the tint value in digital image data file 100 for that pixel location. The resulting value, described in the present invention by the term "mottling value," is then added to the original data for that point as specified in the original digital image data file 100. By repeating the process for all points in the image, mottled image data file 120 is produced.

The software implementation of the present invention removes the mottling gain curves from user control in order to simplify control of the process of the invention. A second gain parameter, which affects all channels equally, is presented to the user in an easy to use graphic user interface. This allows the user to increase or reduce the depth of the mottling emulation. Furthermore the user can select from a variety of mottling frequencies to match the behavior of the volume printer, such as an offset press, on different types of high volume paper stock. In one embodiment of the present invention the user can adjust the gain for each individual primary ink channel independently and can select from a wide range of mottling frequencies. This allows the gain curves to be adjusted to produce a more appropriate mottling emulation.

The method of the present invention can be extended such that at least one of the overall gain, the gain per colorant, and the noise bandwidth is selectable by a user through a graphic user interface. Any two or more of the overall gain, the gain per colorant, and the noise bandwidth may be combined into pre-selected combinations, and the pre-selected combinations can be made selectable by a user through a graphic user interface.

The method of the present invention may be augmented by emulating the grain introduced by the fiber in the volume paper stock. A range of techniques exist to achieve this and will not be discussed in the present invention.

The invention has been described in detail with particular reference to certain preferred embodiments thereof, but it will be understood that variations and modifications can be effected within the scope of the invention.

PARTS LIST 10 printing system
20 printer
30 controller
40 drum
50 print head
60 control program
70 proof media
80 database
90 mottling tile/mottling tile data file
100 digital image data file
110 proof image
120 mottled image data file
130 mottling gain curves
210 providing a digital image data file
220 modifying the digital colorant information in digital image file
230 printing mottled image data file
310 printing a set of color patches at different tint levels between 0 and 100%
320 scanning each of the patches with a high resolution scanner
325 filtering scanned images of the patches
330 determining both the average continuous tone value of every patch and the variation of the continuous tone within that patch
340 compute mottle gain curves
410 generating a random noise distribution
420 applying the distribution across the surface of a tile

The invention claimed is:

1. A method for producing mottling in an image, the method comprising modifying digital colorant information in a digital image data file of the image for at least one of a plurality of colorants, wherein a degree of the modifying is based on:
   a) the digital colorant information in the digital image data file; and
   b) mottling information from a mottling tile;
   wherein the modifying comprises identifying a mottle degree for an image digital colorant value based on a mottling gain curve for the colorant, modifying the mottling information based on the mottle gain value, and combining the digital colorant information and the modified mottling information.

2. The method of claim 1, wherein the colorant gain curve for the at least one colorant is obtained by a process comprising determining as a function of tint percentage a variation of a tint of a printed at least one colorant when printed at a tint percentage on a volume printing stock.

3. The method of claim 1, wherein the mottling information has a spatial frequency distribution substantially equal to the spatial frequency distribution of the mottling produced by the at least one colorant on a volume printing stock.

4. The method of claim 1, comprising modifying the digital image data file to emulate the grain produced by the fiber in the printable media.

5. The method of claim 1, wherein at least one of the overall gain, the gain per colorant and the noise bandwidth is selectable by a user through a graphic user interface.

6. The method of claim 1, wherein pre-selected combinations of two or more of overall gain, gain per colorant or noise bandwidth are selectable by a user through a graphic user interface.

* * * * *